United States Patent
Suzuki et al.

(10) Patent No.: US 7,847,952 B2
(45) Date of Patent: Dec. 7, 2010

(54) DELAYED INTERFEROMETER ENABLING A REDUCTION OF POLARIZATION-DEPENDENT FREQUENCY SHIFT AND DEMODULATOR

(75) Inventors: Yasuyuki Suzuki, Musashino (JP); Yoshihiro Sanpei, Musashino (JP); Shinji Iio, Musashino (JP); Morio Wada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 144 days.

(21) Appl. No.: 12/044,717

(22) Filed: Mar. 7, 2008

(65) Prior Publication Data

US 2008/0218836 A1 Sep. 11, 2008

(30) Foreign Application Priority Data

Mar. 9, 2007 (JP) .............................. 2007-060497

(51) Int. Cl.
*G01B 9/02* (2006.01)
(52) U.S. Cl. ..................................................... 356/491
(58) Field of Classification Search ................. 356/450, 356/491, 249, 577, 578
See application file for complete search history.

(56) References Cited

U.S. PATENT DOCUMENTS

| 5,491,551 A | * | 2/1996 | Mattson ...................... 356/451 |
| 5,684,545 A | * | 11/1997 | Dou et al. ...................... 349/1 |
| 2006/0072927 A1 | | 4/2006 | Kim et al. |
| 2007/0229841 A1 | | 10/2007 | Feldman |

FOREIGN PATENT DOCUMENTS

| EP | 1 426 800 A2 | 6/2004 |
| WO | 02/51041 A2 | 6/2002 |
| WO | 2006/092038 A1 | 9/2006 |

OTHER PUBLICATIONS

Winzer et al., "Degradations in Balanced DPSK Receivers," IEEE Photonics Technology Letters, vol. 15, No. 9, Sep. 2003, pp. 1282-1284, XP011100161.

* cited by examiner

*Primary Examiner*—Hwa S. A Lee
(74) *Attorney, Agent, or Firm*—Sughrue Mion, PLLC

(57) ABSTRACT

An interferometer of the present invention includes: a splitting element which splits an incident light beam into a first split beam and a second split beam; and a first phase compensator which is positioned in an optical path of the first split beam, and which compensates a phase difference occurring between the first split beam and the second split beam upon splitting of the incident light beam by said splitting element.

6 Claims, 9 Drawing Sheets

DELAYED INTERFEROMETER ENABLING A REDUCTION OF POLARIZATION-DEPENDENT FREQUENCY SHIFT AND DEMODULATOR

BACKGROUND OF THE INVENTION

1. Field of the Invention

This invention relates to an interferometer, and to a demodulator employing this interferometer.

Priority is claimed on Japanese Patent Application No. 2007-060497, filed on Mar. 9, 2007, the content of which is incorporated herein by reference.

2. Description of the Related Art

Generally in an interferometer, an incident beam of light is split into a plurality of split beams, and after passing through different optical paths the split beams are caused to interfere, and the interference fringes or similar are measured. One type of interferometer is a delayed interferometer, in which, relative to one split beam, another split beam is delayed, and interference between these beams is caused. Such delayed interferometers are for example provided in the demodulation devices of WDM (Wavelength Division Multiplexing) optical communication systems. A demodulation device in a WDM optical communication system performs wavelength division multiplexing of optical signals modulated by DPSK (Differential Phase Shift Keying) or another modulation method, and transmits the multiplexed signals. Differential phase shift keying is a modulation method in which a signal is modulated by relative phase difference with the phase of the preceding signal to perform modulation.

FIG. 9 and FIG. 10 show the configuration of a delayed interferometer of the conventional art, provided in a demodulation device. The delayed interferometer 100 shown in FIG. 9 is a Mach-Zehnder interferometer, configured with optical lines (optical waveguides). The delayed interferometer 200 shown in FIG. 10 is a bulk-type Mach-Zehnder interferometer, configured with a plurality of optical elements.

The delayed interferometer 100 shown in FIG. 9 includes an input line 101, directional coupler 102, split beam lines 103 and 104, directional coupler 105, and output lines 106 and 107. The input line 101 is an optical line through which differential phase shift keyed WDM light L100 is input. The directional coupler 102 splits the WDM light L100 which has passed through the input line 101 with a prescribed intensity ratio (for example, 1:1).

The split beam lines 103 and 104 are optical lines along which split beams L101 and L102, split by the directional coupler 102, respectively propagate. The optical path lengths of the split beam lines 103 and 104 are set such that the length of the split beam L102 is delayed by a time duration equivalent to one bit of the modulation rate relative to the split beam L101. The directional coupler 105 combines the split beams L101 and L102 via the split beam lines 103 and 104, and causes interference. Further, the directional coupler 105 splits the interference light obtained by interference at a prescribed intensity ratio (for example, 1:1). The output lines 106 and 107 output the interference light split by the directional coupler 105 as output beams L103 and L104.

The delayed interferometer 200 shown in FIG. 10 includes a beam splitter 201, reflecting mirrors 202 and 203, and beam splitter 204. In FIG. 10, light beams equivalent to the WDM light beam L100, split beams L101 and L102, and output beams L103 and L104 in FIG. 9 are indicated using the same symbols. The beam splitter 201 splits the differential phase shift keyed WDM light beam L100 at a prescribed intensity ratio (for example, 1:1). The reflecting mirrors 202 and 203 form a so-called corner cube mirror. The reflecting mirrors 202 and 203 guide one of the split beams L102 to the beam splitter 204 by successively reflecting the split beam L102 split by the beam splitter 201.

The beam splitter 204 combines the other split beam L101 split by the beam splitter 201 with the split beam L102 guided by the reflecting mirrors 202 and 203, to cause interference. Further, the beam splitter 204 splits the inference beam obtained by interference at a prescribed intensity ratio (for example, 1:1). The interference light beams split by the beam splitter 204 are output as output light beams L103 and L104. The beam splitters 201 and 204 and reflecting mirrors 202 and 203 are positioned in relative positions such that the split beam L102 is delayed, relative to the split beam L101, by a time duration equivalent to one bit of the modulation rate of the WDM beam L100.

When WDM light L100 is input to a delayed interferometer 100 or 200 configured as above, the light is split into a split beam L101 and a split beam L102. As a result of propagation of the split beams L101 and L102 over different optical paths, a delay occurs in the split beam L102, by a time duration equivalent to one bit of the modulation rate of the WDM light L100. Then, the split beams L101 and L102 are combined and caused to interfere, and a as result phase comparison is performed between the split beam 101 and the split beam L102 delayed by the time duration described above. The interference light, having intensity according to the comparison result, is output as the output light beams L103 and L104. By this means, demodulation of the different phase shift keyed WDM light L100 (i.e. demodulation of WDM light L100 which is modulated by the relative phase difference with the phase of the preceding signal) is performed.

Details of a demodulation device employing a delayed interferometer of the conventional art in a WDM optical communication system may for example be found in Published Japanese Translation of PCT Application 2004-516743 (PCT Publication No. WO 02/51041).

In order to improve the performance (for example, the optical signal-to-noise ratio (OSNR), Q value, or similar) of the above-described delayed interferometers used in demodulation devices in WDM optical communication systems, the phase of the interferometer must be precisely matched with the carrier light of the transmitting signal. To this end, delayed interferometers are provided with a phase adjustment mechanism for fine adjustment of the phase of the interferometer relative to the carrier light, and the phase adjustment is performed with precision.

Ideally, a splitting element employed by a delayed interferometer (for example, the directional coupler 102 or beam splitter 201) splits an incident light beam at a prescribed intensity ratio, regardless of the polarization state of the incident light (S-polarized or P-polarized), and without causing a relative phase difference between the split beams. However, actual splitting elements deviate from this ideal case. Hence relative phase differences between split beams occur, according to the polarization state of the incident light, arising from imperfections in the splitting element. Due to such phase differences, there is the problem of occurrence of phenomena in which the phase of a delayed interferometer changes depending on the polarization state of the incident light (PDFS: Polarization-Dependent Frequency Shift).

The above polarization-dependent frequency shift cannot be eliminated using the above-described phase adjustment mechanism, and is a factor detracting from the performance of a delayed interferometer. The polarization-dependent frequency shift (PDFS) is not a problem inherent only in delayed interferometers such as the delayed interferometers 100 and 200 shown in FIG. 9 and FIG. 10, but is a problem which occurs in interferometers in general which employ splitting elements such as half-mirrors, beam splitters, and similar.

SUMMARY OF THE INVENTION

The present invention has been devised in light of the above circumstances. An object of the invention is to provide an interferometer enabling reduction of the polarization-dependent frequency shift (PDFS) which occur due to imperfection in splitting elements, as well as a demodulator which employs such an interferometer.

In order to attain this object, an interferometer of the present invention comprises: a splitting element which splits an incident light beam into a first split beam and a second split beam; and a first phase compensator which is positioned in an optical path of the first split beam, and which compensates a phase difference occurring between the first split beam and the second split beam upon splitting of the incident light beam by said splitting element.

According to the interferometer of the present invention, the incident beam which is incident on the interferometer is split into a first split beam and a second split beam. The first split beam passes through the first phase compensator, positioned in the optical path thereof, and by this means the phase difference between the first split beam and the second split beam is compensated.

The interferometer of the present invention may further comprise a second phase comparator which is positioned in an optical path of the second split beam, and which compensates the phase difference occurring between the first split beam and the second split beam upon splitting of the incident light beam by said splitting element.

In the interferometer of the present invention, said first phase compensator may be a phase retardation plate comprising a uniaxial crystal, and a thickness of said phase retardation plate is set according to the phase difference between the first split beam and the second split beam.

In the interferometer of the present invention, said phase retardation plate may be positioned such that an optical axis of said phase retardation plate is either perpendicular to or is parallel to a plane of incidence of the incident light on said splitting element.

In the interferometer of the present invention, said phase retardation plate may be formed by laminating a first phase retardation plate having a first thickness and positioned such that an optical axis of said first phase retardation plate is either perpendicular to or parallel to a plane of incidence of the incident light on said splitting element, and a second phase retardation plate having a second thickness and positioned such that an optical axis of said second phase retardation plate is perpendicular to the optical axis of said first phase retardation plate.

In the interferometer of the present invention, said first phase compensator may be a phase retardation plate comprising a crystal having an electrooptical effect in which a refractive index changes upon application of a voltage.

In the interferometer of the present invention, said first phase compensator may be a phase retardation plate comprising a crystal having a photoelastic effect in which a refractive index changes upon application of a stress.

The interferometer of the present invention may further comprises a first reflecting member which reflects the first split beam toward said splitting element, and a second reflecting member which reflects the second split beam toward said splitting element, wherein, the first split beam reflected by the first reflecting member, and the second split beam reflected by the second reflecting member are incident on said splitting element, so as to cause interference between said first split beam and said second split beam.

In the interferometer of the present invention, said first phase compensator may be positioned in both an outbound path of the first split beam propagating toward said first reflecting member from said splitting element, and an inbound path of the first split beam propagating toward said splitting element from said first reflecting member.

A demodulator of the present invention, which demodulates an optical signal modulated by a differential phase-shift keying, comprises an interferometer of the present invention in which a difference in optical path lengths of the first split beam and the second split beam is set such that, relative to one of the first split beam and the second split beam, another of the first split beam and the second split beam is delayed by a time duration equivalent to one bit of a modulation rate of the optical signal; and an optical detector which receives interference light obtained from said interferometer and generates a demodulated signal.

According to this invention, a phase compensator is provided in the optical path of one split beam among the split beams split by a splitting element, and the phase difference between the split beams occurring upon splitting of the incident light by the splitting element is compensated. Hence there is the advantageous result that polarization-dependent frequency shifts (PDFS) in the interferometer arising due to imperfection of the splitting element can be reduced.

DETAILED DESCRIPTION OF THE INVENTION

Figure 1:
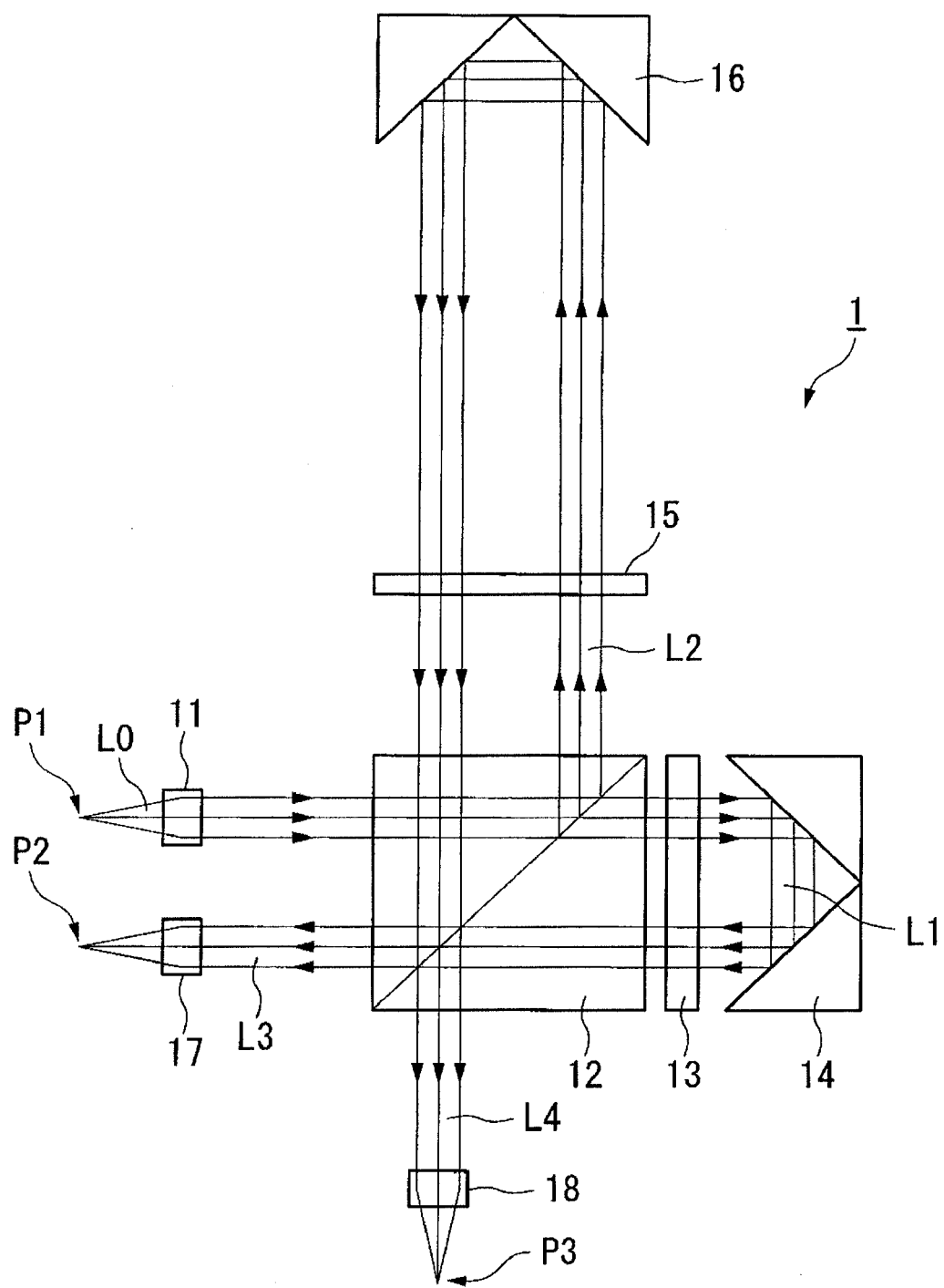
FIG. 1 shows the configuration of principal portions of the interferometer of a first embodiment of the invention.

Below, interferometers and demodulators of embodiments of the invention are explained in detail, referring to the drawings.

First Embodiment

FIG. 1 shows the configuration of principal portions of the interferometer of a first embodiment of the invention. As shown in FIG. 1, the interferometer 1 of this embodiment is a Michelson-type delayed interferometer including an incidence lens 11, half-mirror 12 (splitting element), phase retardation plate 13 (phase compensator), corner-cube mirror 14 (reflecting member), phase retardation plate 15 (phase compensator), corner-cube mirror 16 (reflecting member), and emission lenses 17 and 18.

The incidence lens 11 converts the incident light L0, incident from the incidence port P1, into a parallel light beam. At the position of the incidence port P1, for example, the emission end of an optical fiber (not shown) is positioned. Light emitted from the emission end of this optical fiber is incident on and enters the interferometer 1 as incident light L0. The half-mirror 12 splits the incident light L0, converted into a parallel beam by the incidence lens 11, into split beams L1 and L2 having a prescribed intensity ratio (for example, 1:1). The half-mirror 12 combines split beams L1 and L2 reflected by the corner-cube mirrors 14 and 16 respectively to cause interference, and also splits the interference light obtained by interference at a prescribed intensity ratio (for example, 1:1).

The phase retardation plate 13 is positioned in the optical path of the split beam L1, which is one of the beams split by the half-mirror 12. The phase retardation plate 13 adjusts the phase of the split beam L1. The corner-cube mirror 14 is a mirror having two reflecting surfaces perpendicular each other. In the corner-cube mirror 14, the split beam L1, which is split by the half-mirror 12 and is incident on the mirror 14 after passing through the phase retardation plate 13, is reflected toward the half-mirror 12. In this embodiment, the phase retardation plate 13 is positioned in both the outbound optical path, in which the split beam L1 split by the half-mirror 12 propagates toward the corner-cube mirror 14, and in the inbound optical path, in which the split beam L1, after being reflected by the corner-cube mirror 14, propagates toward the half-mirror 12. That is, the phase retardation plate 13 is positioned in both an outbound path of the split beam L1 propagating toward the corner-cube mirror 14 from the half-mirror 12, and in an inbound path of the split beam L1 propagating toward the half-mirror 12 from the corner-cube mirror 14. This is done in order to suppress changes in the optical path of the split beam L1 (that is, shifts in position of incidence of the split beam L1 relative to the half-mirror 12) if the phase retardation plate 13 is inclined with respect to the split beam L1.

The phase retardation plate 15 is positioned in the optical path of the split beam L2, which is the other beam split by the half-mirror 12. The phase retardation plate 15 adjusts the phase of the split beam L2. The corner-cube mirror 16 is a mirror having two reflecting surfaces perpendicular each other, similar to the corner-cube mirror 14. In the corner-cube mirror 16, the split beam L2, which is split by the half-mirror 12 and is incident on the mirror 16 after passing through the phase retardation plate 15, is reflected toward the half-mirror 12. The corner-cube mirrors 14 and 16 are positioned relative to the half-mirror 12 such that there is a delay by a prescribed length of time of the split beam L2 relative to the split beam L1. The delay time of the split beam L2 relative to the split beam L1 can be set arbitrarily.

Similarly to the phase retardation plate 13, the phase retardation plate 15 is positioned in both the outbound optical path of the split beam L2 split by the half-mirror 12 and propagating toward the corner-cube mirror 16, and in the inbound optical path of the split beam L2 which has been reflected by the corner-cube mirror 16 and is propagating toward the half-mirror 12. That is, the phase retardation plate 15 is positioned in both an outbound path of the split beam L2 propagating toward the corner-cube mirror 16 from the half-mirror 12, and in an inbound path of the split beam L2 propagating toward the half-mirror 12 from the corner-cube mirror 16. By this means, changes in the optical path of the split beam L2 (that is, shifts in position of incidence of the split beam L2 relative to the half-mirror 12) are suppressed if the phase retardation plate 15 is inclined with respect to the split beam L2.

The emission lens 17 condenses the interference light beam L3, which is one of the light beams obtained by causing interference of the split beams L1 and L2 using the half-mirror 12, at the emission port P2. The emission lens 18 condenses the interference light beam L4, which is the other light beam obtained by causing interference of the split beams L1 and L2 using the half-mirror 12, at the emission port P3. Incidence faces of for example optical fibers (not shown) are positioned at the positions of the emission ports P2 and P3. The interference light beams L3 and L4 emitted from these emission ports P2 and P3 are guided to outside the interferometer 1 by the optical fibers.

Next, the phase retardation plates 13 and 15 are explained in detail. As stated above, phase retardation plate 13 adjusts the phase of split beam L1, and phase retardation plate 15 adjusts the phase of split beam L2. By using phase retardation plates 13 and 15 to adjust the phases of split beams L1 and L2 respectively, the phase difference between split beams L1 and L2, occurring when the incident light beam L0 is split by the half-mirror 12, can be compensated. As a result, the phenomenon in which the interferometer phase changes depending on the state of polarization of the incident light (PDFS, polarization-dependent frequency shift) is reduced.

The actual state of the above polarization-dependent frequency shift (PDFS) is the phase fluctuation of the interferometer 1 due to retardation between two orthogonal inherent polarizations (the S polarization and P polarization at the half-mirror 12). This retardation occurs due to imperfection in the half-mirror 12. Hence the polarization-dependent frequency shift (PDFS) is fixed and does not change with time. Therefore, the phase difference between split beams L1, L2 can be reduced by using phase retardation plates 13 and 15 which compensate the phase difference.

Figure 2:
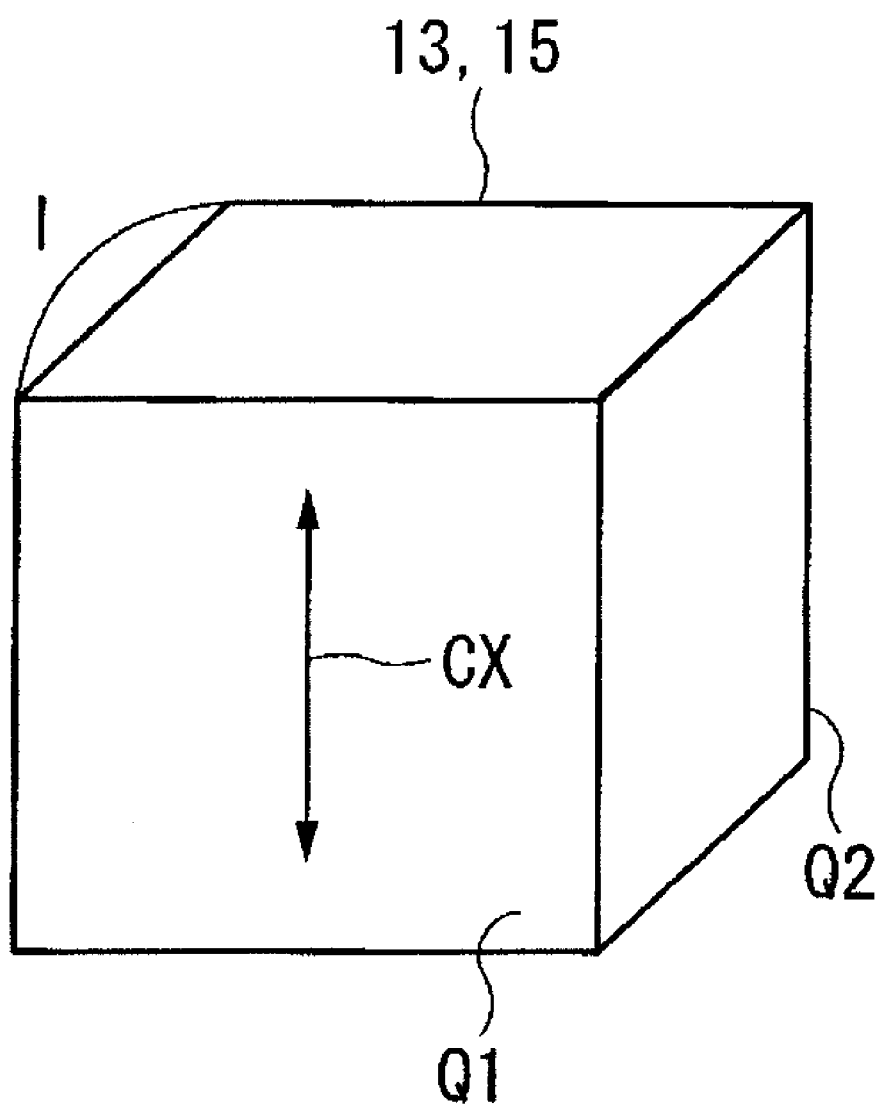
FIG. 2 is an external perspective view showing the phase retardation plates of the interferometer of FIG. 1.

FIG. 2 is a perspective view showing the exterior of the phase retardation plates 13 and 15. In FIG. 2, the thickness is shown in exaggerated fashion. The phase retardation plates 13 and 15 are optical members formed from uniaxial crystal with a thin plate shape, the thickness 1 of which is set according to the phase difference between the split beams L1 and L2. The phase retardation plates 13 and 15 are formed such that the surface Q1 opposing the half-mirror 12, and the surface Q2 opposing the surface Q1, are parallel. As the uniaxial crystal used to form phase retardation plates 13 and 15, for example quartz, calcite, magnesium fluoride ($MgF_2$), or similar can be used.

Phase retardation plates 13 and 15 are positioned such that the optical axis CX is perpendicular to or parallel to the plane of incidence (in FIG. 1, the plane parallel to the plane of the paper) of the half-mirror 12 on which incident light L0 is incident. Specifically, when phase retardation plate 13 is positioned such that the optical axis CX is perpendicular to the plane of incidence, phase retardation plate 15 is also positioned such that the optical axis CX is perpendicular to the plane of incidence. When phase retardation plate 13 is positioned such that the optical axis CX is parallel to the plane of incidence, phase retardation plate 15 is also positioned such that the optical axis CX is parallel to the plane of incidence.

Figure 3A:
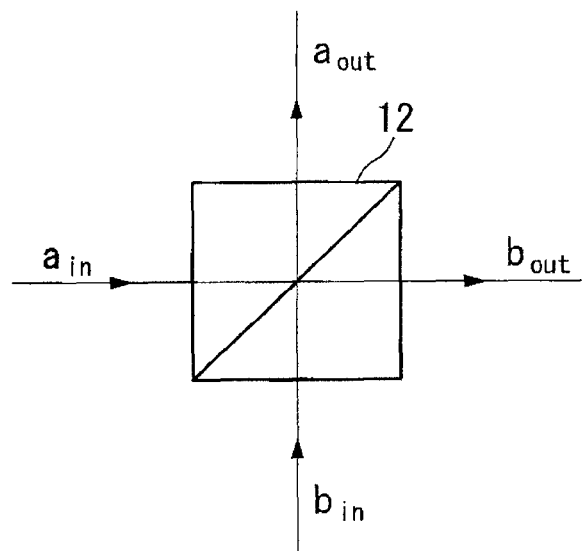
FIG. 3A is a figure used to explain a method of setting the thicknesses of the phase retardation plates shown in FIG. 2.
Figure 3B:
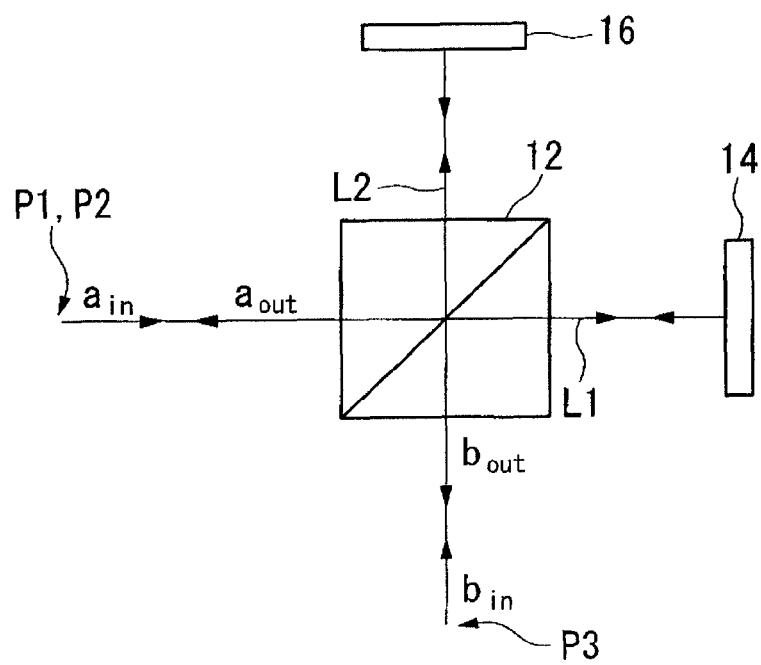
FIG. 3B is a figure used to explain a method of setting the thicknesses of the phase retardation plates shown in FIG. 2.

Next, the method used to set the thicknesses of phase retardation plates 13 and 15 is explained. FIG. 3A and FIG. 3B are figures used to explain a method of setting the thicknesses of the phase retardation plates 13 and 15. As shown in FIG. 3A, $a_{in}$ and $b_{in}$ are two incident beams incident on the half-mirror 12, and $a_{out}$ and $b_{out}$ are two emission beams emitted from the half-mirror 12. The relation between these incident beams and emission beams is given by the following equation (1).

$$\begin{pmatrix} a_{out} \\ b_{out} \end{pmatrix} = \begin{pmatrix} r_{11} & t_{21} \\ t_{12} & r_{22} \end{pmatrix} \begin{pmatrix} a_{in} \\ a_{in} \end{pmatrix} \quad (1)$$

Here, the variables $r_{11}$ and $r_{22}$ in equation (1) are amplitude reflectances for the half-mirror 12, and the variables $t_{12}$ and $t_{21}$ are amplitude transmittances for the half-mirror 12.

Assuming that there are no losses when the incident beams $a_{in}$, $b_{in}$ pass through the half-mirror 12, the energy conservation relation $|a_{in}|^2 + |b_{in}|^2 = |a_{out}|^2 + |b_{out}|^2$ is considered. Then the amplitude reflectances $r_{11}$, $r_{22}$ and amplitude transmittances $t_{12}$, $t_{21}$ are expressed by the following equation (2).

$$t_{12} = t_{21} = \sqrt{T}$$

$$r_{11} = i\sqrt{R} e^{-i\alpha}$$

$$r_{22} = i\sqrt{R} e^{i\alpha} \quad (2)$$

Here, the variables R and T in equation (2) are the intensity reflectance and intensity transmittance respectively of the half-mirror 12, and the relation R+T=1 obtains. The variable $\alpha$ is the phase difference of reflected light with reference to transmitted light generated at the half-mirror 12.

If the half-mirror 12 had ideal characteristics, then the phase difference $\alpha$ would be 0. The value of the phase difference $\alpha$ is determined by the polarization state of the incident light. At actual half-mirrors 12, phase shifts are thought to occur either in transmitted light or in reflected light, or in both. However, for simplicity, here it is assumed that no phase shift occurs in transmitted light, and that phase shifts occur only in reflected light.

Next, the interferometer 1 is considered. FIG. 3B is a simplified view of the interferometer 1. As shown in FIG. 3B, $a_{in}$ and $b_{in}$ are two incident beams which are incident on the half-mirror 12, while the emission beam emitted in the direction opposite the incidence direction of incident beam $a_{in}$ is $a_{out}$, and the emission beam emitted in the direction opposite the incidence direction of incident beam $b_{in}$ is $b_{out}$. The relation between these incident beams and emission beams can be expressed by the following equation (3).

$$\begin{pmatrix} a_{out} \\ b_{out} \end{pmatrix} = \begin{pmatrix} r_{11} & t_{21} \\ t_{12} & r_{22} \end{pmatrix} \begin{pmatrix} e^{-ikL_1} & 0 \\ 0 & e^{-ikL_2} \end{pmatrix} \begin{pmatrix} r_{11} & t_{21} \\ t_{12} & r_{22} \end{pmatrix} \begin{pmatrix} a_{in} \\ b_{in} \end{pmatrix} \quad (3)$$

$$= e^{-ik\frac{L_1+L_2}{2}} \begin{pmatrix} r_{11}^2 e^{-i\Delta\phi} + t_{12}t_{21}e^{i\Delta\phi} & t_{21}r_{11}e^{-i\Delta\phi} + t_{12}r_{22}e^{i\Delta\phi} \\ t_{12}r_{11}e^{-i\Delta\phi} + t_{12}r_{22}e^{i\Delta\phi} & t_{12}t_{21}e^{-i\Delta\phi} + r_{22}^2 e^{i\Delta\phi} \end{pmatrix}$$

$$\begin{pmatrix} a_{in} \\ b_{in} \end{pmatrix}$$

Here, the variable k in equation (3) is the wave number of the incident beams $a_{in}$ and $b_{in}$ and the emission beams $a_{out}$ and $b_{out}$, and $L_1$ and $L_2$ are the optical path lengths of the optical paths of the split beams L1 and L2 respectively. The variable $\Delta\phi$ is the phase difference of split beam L2 with respect to split beam L1, arising due to the optical path length difference for the split beams L1 and L2. $\Delta\phi$ is expressed by equation (4) below.

$$\Delta\phi = k\frac{L_1 - L_2}{2} \quad (4)$$

$$= k\frac{\Delta L}{2}$$

$$= \pi\frac{\Delta L}{\lambda}$$

$$= \pi f\frac{\Delta L}{c}$$

$$= \pi f T_d$$

$$= \pi\frac{f}{FSR}$$

In equation (4), the variable c is the speed of light, and the variables $\lambda$ and f are the wavelength and frequency of the incident beams $a_{in}$ and $b_{in}$ and the emission beams $a_{out}$ and $b_{out}$. The variable $T_d$ is the delay time of the split beam L2 relative to the split beam L1. The variable FSR is the free spectral range of interference light obtained by causing interference of the split beams L1 and L2.

If the incident beam $b_{in}=0$ in accordance with the interferometer 1 shown in FIG. 1, then the powers $P_a$ and $P_b$ of the inference light beams L3 and L4 output from emission ports P2 and P3 are given by equation (5) below.

$$P_a \equiv \left|\frac{a_{out}}{a_{in}}\right|^2 \quad (5)$$

$$= |r_{11}^2 e^{-i\Delta\phi} + t_{12}t_{21}e^{i\Delta\phi}|^2$$

$$= R^2\left|-e^{i2\alpha}e^{-i\Delta\phi} + \frac{T}{R}e^{i\Delta\phi}\right|^2$$

$$P_b \equiv \left|\frac{b_{out}}{a_{in}}\right|^2$$

$$= |t_{12}r_{11}e^{-i\Delta\phi} + t_{12}r_{22}e^{i\Delta\phi}|^2$$

$$= TR|e^{i2\alpha}e^{-i\Delta\phi} + e^{i\Delta\phi}|^2$$

When the half-mirror 12 splits the incident beam with a 1:1 intensity ratio, T=R=0.5. If the half-mirror 12 is assumed to be ideal, so that the phase difference $\alpha=0$, then the above equation (5) becomes equation (6) below.

$$P_a = \sin^2\Delta\phi$$

$$P_b = \cos^2\Delta\phi \quad (6)$$

However, an actual half-mirror 12 is not ideal, and so the phase difference α≠0. Further, the phase difference α varies depending on the polarization state of the light incident on the half-mirror 12. As a result, polarization-dependent frequency shifts (PDFS) occur, causing changes in the phase of the interferometer 1. Due to the construction of the half-mirror 12, the phase difference α is maximum or minimum for P polarization or for S polarization. Hence, if the maximum and minimum values of the phase difference α are known, the phase difference α can be compensated, and the polarization-dependent frequency shifts (PDFS) of the interferometer 1 can be reduced.

In equation (5) above, the terms with $e^{i\alpha}$ are brought outside the absolute-value brackets. Further, because the phase difference α changes with the polarization state, the notation α(SP) is used. In this way, the following equation (7) is obtained. The characters "SP" in parentheses above stand for "state of polarization".

$$P_a = R^2 \left| -e^{-i(\Delta\phi - \alpha(SP))} + \frac{T}{R} e^{i(\Delta\phi - \alpha(SP))} \right|^2 \quad (7)$$

$$P_b = TR \left| e^{-i(\Delta\phi - \alpha(SP))} + e^{i(\Delta\phi - \alpha(SP))} \right|^2$$

From the above equation (7), it is seen that when the phase difference α(SP) varies with the polarization state, the powers $P_a$ and $P_b$ of the emission beams $a_{out}$ and $b_{out}$ vary as well. The phase difference α(SP) is maximum and minimum (or, minimum and maximum) for P polarization and S polarization light incident on the half-mirror 12. Hence by inserting, in the optical path of the reflected beam (split beam L2), a phase retardation plate for which the retarded-phase axis/advanced-phase axis (or advanced-phase axis/retarded-phase axis) is set in the polarization direction of the P polarized or S polarized light, the phase difference α(SP) can be compensated. The retardation Γ of the phase retardation plate is expressed as: Γ=Δn·l, and the variable Δn is the difference in refractive indices of the phase retardation plate along the retarded-phase axis and advanced-phase axis.

That is, if the difference between the maximum and minimum values of the phase difference α(SP) is Δα, then the retardation Γ of the phase retardation plate is set such that the following equation (8) is satisfied.

$$\Delta\alpha = \pi \frac{\Delta n \cdot l}{\lambda} \quad (8)$$

The above difference Δα cannot be determined directly. However, if the polarization-dependent frequency shifts (PDFS) of the interferometer 1 are known, then from the following equation (9) the retardation Γ to be set can be determined. In equation (9) below, Δf is the frequency width of the polarization-dependent frequency shifts (PDFS) of the interferometer 1.

$$\Delta\alpha = \pi \frac{\Delta n \cdot l}{\lambda} = \pi \frac{\Delta f}{FSR} \quad (9)$$

As a simple explanation, suppose that a phase shift occurs only in the split beam L2 which is light reflected by the half-mirror 12. A case is considered in which this phase shift is compensated by the phase retardation plate 15 (see FIG. 1).

Suppose that the phase retardation plate 13 is omitted. Assume that the wavelength λ of the incident light is 1.55 μm, the frequency shift range (FSR) of the interference pattern of the interferometer 1 is 12.5 GHz, the frequency width Δf of the polarization-dependent frequency shift (PDFS) of the interferometer 1 is 0.6 GHz, and the refractive index difference Δn of the phase retardation plate 15 is 0.0083. In this case, using equation (9), the thickness of the phase retardation plate 15 necessary to compensate the phase difference α(SP) is computed to be 9 μm.

In the above, a method has been explained for determining the thickness of the phase retardation plate 15 when only a phase retardation plate 15 is provided in the interferometer 1. As shown in FIG. 1, when phase retardation plates 13 and 15 are provided in the optical paths of split beams L1 and L2 respectively, the respective thicknesses of the phase retardation plates 13 and 15 may be set such that the difference in thicknesses of the phase retardation plates 13 and 15 is the thickness computed using the above equation (9).

Figure 4A:
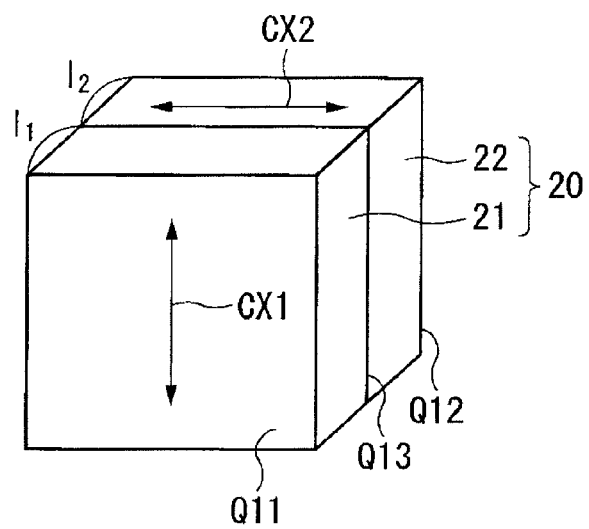
FIG. 4A shows a modified example of phase retardation plates in the interferometer of the first embodiment of the invention.
Figure 4B:
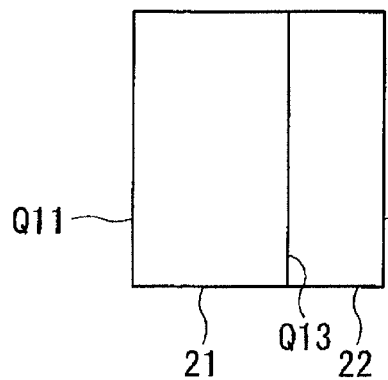
FIG. 4B is a side view of the phase retardation plate shown in FIG. 4A.
Figure 4C:
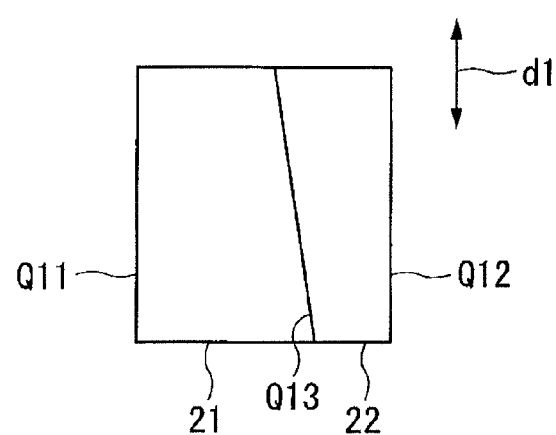
FIG. 4C is a side view of the phase retardation plate shown in FIG. 4A.

Next, a modified example of a phase retardation plate is explained. FIG. 4A through FIG. 4C show a phase retardation plate, the thickness of which is shown exaggerated. The phase retardation plate 20 shown in FIG. 4A through FIG. 4C is formed by laminating a first phase retardation plate 21 and a second phase retardation plate 22. The first phase retardation plate 21 and second phase retardation plate 22 are thin-shaped optical members, formed from uniaxial crystals. The first phase retardation plate 21 and second phase retardation plate 22 are laminated such that the optical axis CX1 of the first phase retardation plate 21 and the optical axis CX2 of the second phase retardation plate 22 are perpendicular. As the uniaxial crystals used to form the first phase retardation plate 21 and second phase retardation plate 22, similarly to the phase retardation plates 13 and 15, quartz, calcite, magnesium fluoride ($MgF_2$), and similar can be used.

Similarly to the above-described phase retardation plates 13 and 15, this phase retardation plate 20 is also positioned such that the optical axis CX is perpendicular or parallel to the plane of incidence (the plane parallel to the plane of the paper in FIG. 1) of incident light incident on the half-mirror 12. That is, when positioned such that the optical axis CX1 of the first phase retardation plate 21 is perpendicular to the plane of incidence, the optical axis CX2 of the second phase retardation plate 22 is positioned so as to be parallel to the plane of incidence. Conversely, when positioned such that the optical axis CX1 of the first phase retardation plate 21 is parallel to the plane of incidence, the optical axis CX2 of the second phase retardation plate 22 is positioned so as to be perpendicular to the plane of incidence. When phase retardation plates 20 are positioned in the optical paths of the split beams L1 and L2 shown in FIG. 1, for example the optical axis CX1 of the first phase retardation plate 21 of the phase retardation plate 20 positioned in the optical path of the split beam L1 and the optical axis CX1 of the first phase retardation plate 21 of the phase retardation plate 20 positioned in the optical path of the split beam L2 are parallel.

The thicknesses $l_1$ and $l_2$ of the first phase retardation plate 21 and second phase retardation plate 22 respectively, employed in the phase retardation plate 20, are set according to the phase difference between the split beams L1 and L2. Specifically, the retardation Γ of the phase retardation plate 20 is determined so as to satisfy the above-described equation (8). The retardation Γ of the phase retardation plate 20 is expressed as: Γ=Δn·($l_1$−$l_2$).

For example, when a phase retardation plate 20 is positioned only in the optical path of split beam L2 (phase retardation plate 13 in FIG. 1 is omitted, and in place of phase retardation plate 15, phase retardation plate 20 is inserted), the difference between the thicknesses of the first phase retardation plate 21 and second phase retardation plate 22 is determined such that the thickness is as determined using the above-described equation (9).

FIG. 4B and FIG. 4C are side views of the phase retardation plate 20. As shown in FIG. 4B, the phase retardation plate 20 is formed with the surface Q11 opposing the half-mirror 12, the surface Q12 opposing the surface Q11, and the laminated surface Q13 between the first phase retardation plate 21 and second phase retardation plate 22 all parallel. If the first phase retardation plate 21 and second phase retardation plate 22 are formed from the same crystal and refraction at the laminated surface Q13 can be ignored, the phase retardation plate 20 may be formed as follows. That is, as shown in FIG. 4C, the first phase retardation plate 21 and second phase retardation plate 22 are formed in wedge shapes, and the phase retardation plate 20 is formed such that the laminated surface Q13 is inclined with respect to the surfaces Q11 and Q12. By inclining the laminated surface Q13, fine adjustment of the retardation Γ can be performed by moving the phase retardation plate 20 in the direction indicated by the symbol d1 in FIG. 4C.

Figure 5A:
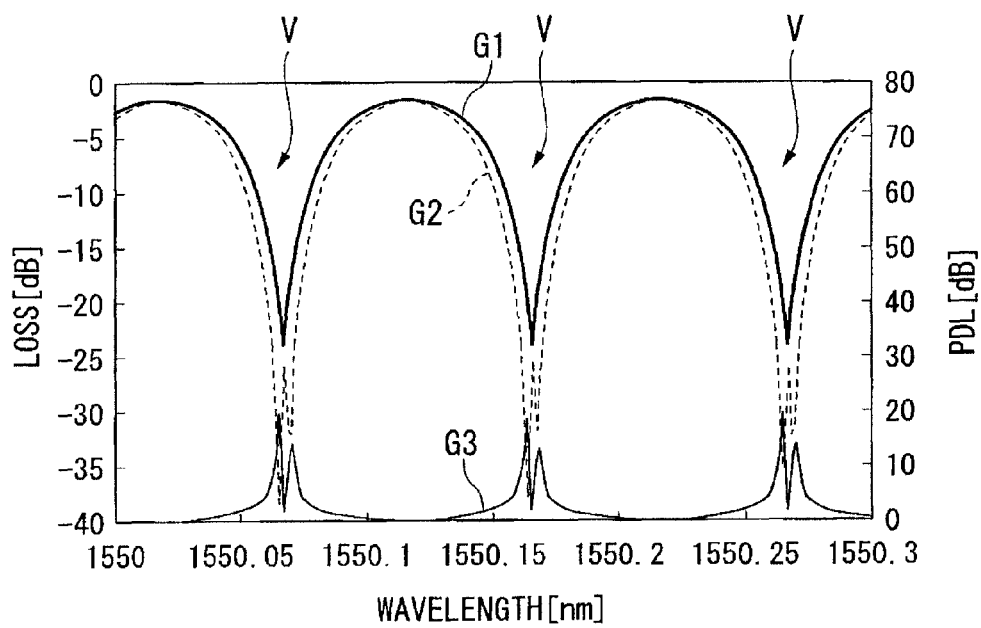
FIG. 5A shows an example of transmission characteristics of the interferometer shown in FIG. 1, for a case in which the phase retardation plates of the first embodiment of the invention are not provided.
Figure 5B:
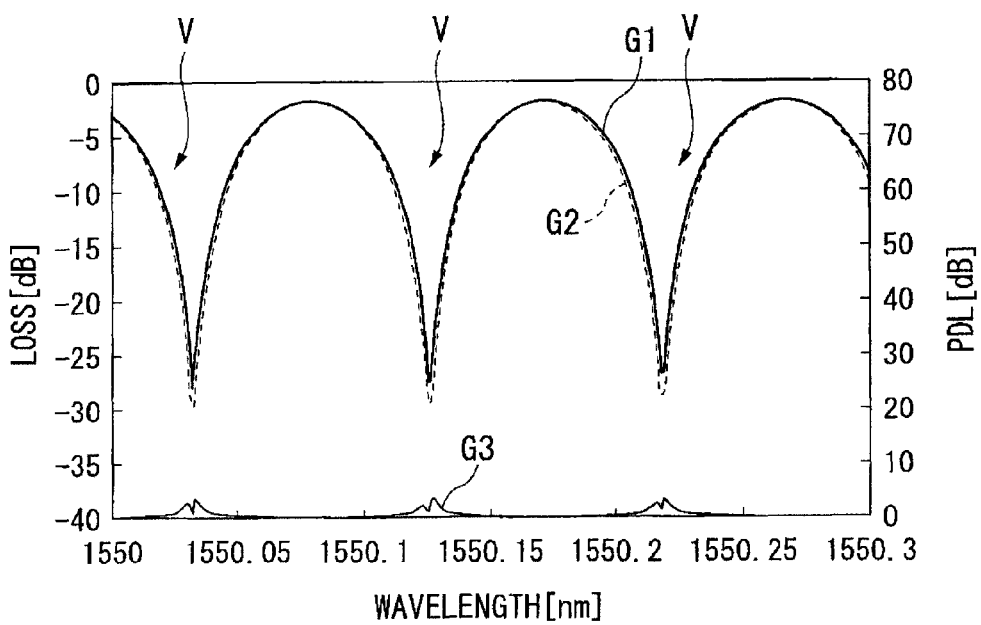
FIG. 5B shows an example of transmission characteristics of the interferometer shown in FIG. 1, for a case in which the phase retardation plates of the first embodiment of the invention is provided.

FIG. 5A and FIG. 5B are diagrams showing examples of the transmission characteristics of the interferometer 1 of the first embodiment of the invention. FIG. 5A shows an example of the transmission characteristic when a phase retardation plate is not provided. FIG. 5B shows an example of the transmission characteristic when a phase retardation plate is provided. FIG. 5A and FIG. 5B show transmission characteristics for the interferometer 1 when incident light L0 in a random polarization state is made incident on the interferometer 1, while changing the wavelength. In FIG. 5A and FIG. 5B, the horizontal axis indicates the wavelength and the vertical axis indicates the loss. In FIG. 5A and FIG. 5B, portions indicated by arrows marked with a "V" symbol are "nodes" at which the split beams L1 and L2 are both weak.

In FIG. 5A and FIG. 5B, curves labeled with the symbol "G1" represent the maximum transmittance of the interferometer 1 when incident light L0 in a random polarization state is made incident on the interferometer 1. In FIG. 5A and FIG. 5B, curves labeled with the symbol "G2" represent the minimum transmittance of the interferometer 1 when incident light L0 in a random polarization state is made incident on the interferometer 1. Curves labeled with the symbol "G3" represent changes in the transmittance (PDL, polarization-dependent loss: difference between the maximum transmittance G1 and minimum transmittance G2) dependent on the polarization state of the incident light L0.

Referring to FIG. 5A, it is seen that when a phase retardation plate is not provided in the interferometer 1, a difference between the maximum transmittance G1 and minimum transmittance G2 occurs over nearly the entire wavelength range. The value of PDL (curve G3) indicating the difference between the maximum transmittance G1 and minimum transmittance G2 is seen to become larger at node portions. This is thought to be because incident light in a random polarization state is made incident on the half-mirror 12, so that a phase difference corresponding to the polarization state occurs between the split beams L1 and L2, and the split beams L1 and L2 are weakened by the extent of this phase difference.

On the other hand, referring to FIG. 5B, it is seen that by providing a phase retardation plate in the interferometer 1, almost no difference occurs between the maximum transmittance G1 and minimum transmittance G2. There is a slight PDL occurrence (curve G3) in the node portions, but compared with the PDL shown in FIG. 5A the values are seen to be extremely small. This is thought to be because by providing a phase retardation plate, the phase difference between the split beams L1 and L2 is compensated, and weakening of the split beams L1 and L2 is reduced.

As explained above, by means of the interferometer 1 of this embodiment, polarization-dependent frequency shifts (PDFS) of the interferometer 1 arising from imperfection of the half-mirror 12 can be reduced, as follows. That is, a phase retardation plate is provided in the optical path of at least one split beam among the split beams L1 and L2 split by the half-mirror 12. By this means, the phase difference between the split beams L1 and L2 arising upon splitting of the incident light L0 by the half-mirror 12 is compensated.

Second Embodiment

Next, the interferometer of a second embodiment of the invention is explained. The interferometer 1 of the first embodiment explained above employed phase retardation plates 13 and 15 or a phase retardation plate 20 formed from uniaxial crystal. The interferometer of the second embodiment differs from this in that, in place of the above phase retardation plates 13 and 15 or phase retardation plate 20, a phase retardation plate formed from a crystal having an electrooptical effect, or a phase retardation plate formed from a crystal having a photoelastic effect, is used.

Figure 6A:
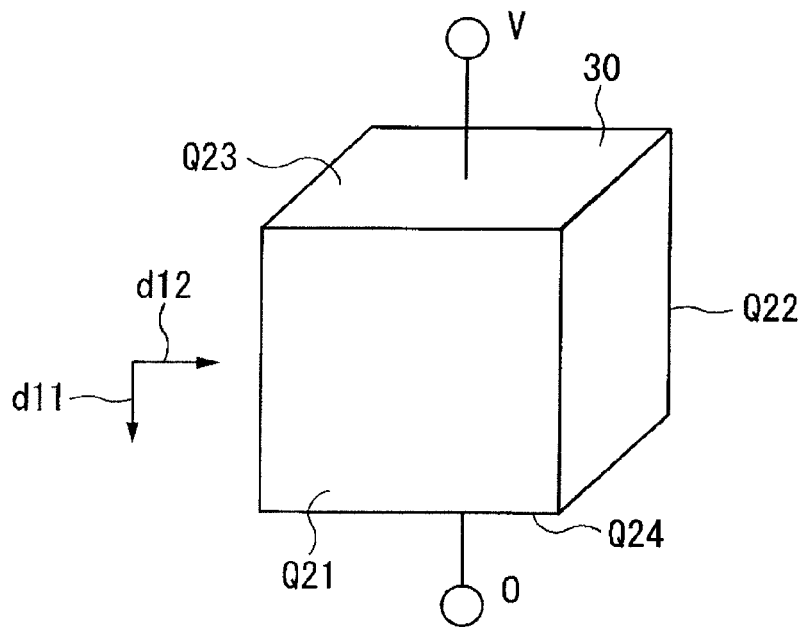
FIG. 6A is an external view of a phase retardation plate employing a crystal having an electrooptical effect, employed by the interferometer of a second embodiment of the invention.
Figure 6B:
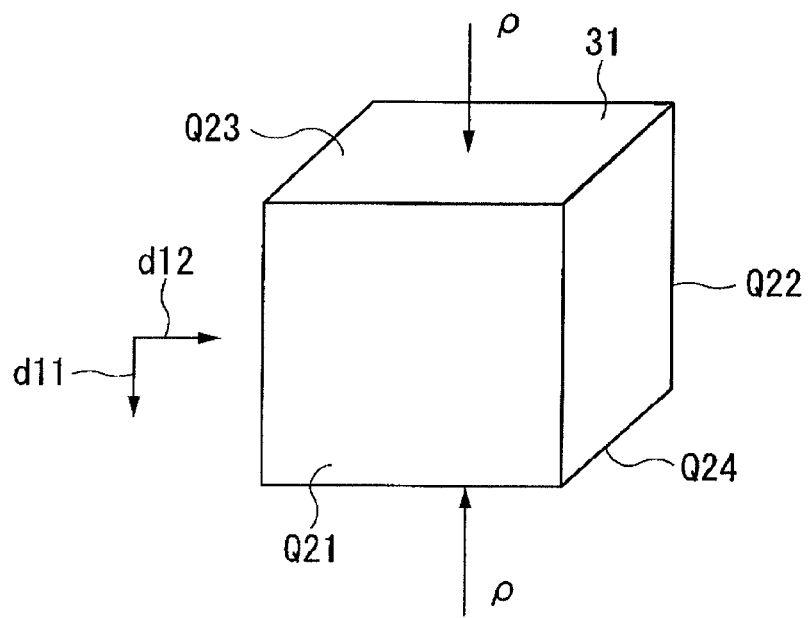
FIG. 6B is an external view of a phase retardation plate employing a crystal having a photoelastic effect, employed by the interferometer of the second embodiment of the invention.

FIG. 6A and FIG. 6B are figures showing the exterior of phase retardation plates used by the interferometer of the second embodiment of the invention. FIG. 6A shows the exterior of a phase retardation plate 30 formed from a crystal having an electrooptical effect. FIG. 6B shows the exterior of a phase retardation plate 31 formed from a crystal having a photoelastic effect. FIG. 6A and FIG. 6B show the phase retardation plates 30 and 31 with the thickness exaggerated. As shown in FIG. 6A and FIG. 6B, the phase retardation plates 30 and 31 are both optical members with a rectangular solid shape. The phase retardation plates 30 and 31 are formed such that the surface Q21 opposing the half-mirror 12 and the surface Q22 opposing the surface Q21 are parallel.

As shown in FIG. 6A, by applying a voltage across surfaces Q23 and Q24 of the phase retardation plate 30 in the direction perpendicular thereto indicated by symbol d11, a difference occurs between the refractive index of the phase retardation plate 30 in the direction d11 of application of the voltage, and the direction d12 perpendicular to the direction d11. By this means, an advanced-phase axis and retarded-phase axis are formed in the phase retardation plate 30.

On the other hand, as shown in FIG. 6B, by applying a stress between the pair of surfaces Q23 and Q24 in the direction perpendicular thereto indicated by symbol d11, a difference occurs between the refractive index of the phase retardation plate 31 in the direction d11 of application of the stress, and the direction d12 perpendicular to the direction d11. By this means, an advanced-phase axis and retarded-phase axis are formed in the phase retardation plate 31.

As the crystal used to form the phase retardation plate 30 having an electrooptical effect, for example, lithium niobate (LiNbO$_3$), lead lanthanum zirconate titanate (PLZT), or similar can be used. As the crystal used to form the phase retardation plate 31 having a photoelastic effect, isotropic crystals such as glass can be used. The phase retardation plates 30 and 31 are used in place of the phase retardation plates 13 and 15 in FIG. 1 or the phase retardation plate 20 of FIG. 4A through FIG. 4C. By applying a voltage or stress, the retardation Γ of the phase retardation plate 30 or 31 is set to a prescribed value. By this means, similarly to the first embodiment, the phase difference between the split beams L1 and L2 can be compensated and polarization-dependent frequency shifts (PDFS) of the interferometer 1 can be reduced. Moreover, by using the phase retardation plates 30 and 31, the amount of compensation of the phase difference between the split beams L1 and L2 can be varied according to the voltage or stress applied. Therefore, fine adjustment of the compensation amount can be performed.

Next, a method of setting the stress to be applied to the phase retardation plate 31 is explained. Let $n_0$ be the refractive index when no stress is being applied to the glass which is the crystal used to form the phase retardation plate 31, and let $n_1$ be the refractive index in direction d11 of the phase retardation plate 31, and $n_2$ be the refractive index in direction d12 of the phase retardation plate 31, when a uniform stress σ is applied in the direction d11 indicated by the arrow in FIG. 6B. At this time, the relation between the refractive indices $n_1$ and $n_2$ and the stress σ is given by equation (10) below.

$$n_1 = n_0 - (1/2)n_0^3 \pi_{11} \sigma \equiv n_0 + C_1$$

$$n_2 = n_0 - (1/2)n_0^3 \pi_{12} \sigma \equiv n_0 + C_2 \quad (10)$$

Here, the variables $\pi_{11}$ and $\pi_{12}$ in equation (10) are piezo-optical coefficients. The variable $C_1$ is a direct stress-optic coefficient. The variable $C_2$ is a transverse stress-optic coefficient. When a stress σ is applied, the glass forming the phase retardation plate 31 behaves like a uniaxial crystal, and the difference in refractive indices Δn between the retarded-phase axis and advanced-phase axis is defined by equation (11) below.

$$\Delta n \equiv n_1 - n_2 = -(1/2)n_0^3(\pi_{11} - \pi_{12})\sigma \equiv (C_1 - C_2) \equiv C\sigma \quad (11)$$

The variable C in equation (11) is a photoelastic constant.

A phase retardation plate 31 of thickness 10 mm, formed from "BK7", which is one type of glass, is considered. The direct stress-optic coefficient $C_1$ of this "BK7" glass is $-0.02 \times 10^{-12}$ m$^2$/N, the transverse stress-optic coefficient $C_2$ is $-2.87 \times 10^{-12}$ m$^2$/N, and the photoelastic constant C is $2.85 \times 10^{-12}$ m$^2$/N. The stress σ to be applied to this phase retardation plate 31 in order to obtain retardation comparable to that of the phase retardation plate 15 formed from a uniaxial crystal (refractive index difference Δn of 0.0083, thickness 9 μm) explained in the first embodiment is as follows.

The retardation Γ of the phase retardation plate 15 formed from a uniaxial crystal, explained in the first embodiment, is computed as the product of the thickness 1 and the reflective index difference Δn between the retarded-phase axis and advanced-phase axis of the phase retardation plate 15. That is, the retardation Γ of the phase retardation plate 15 is 0.0083 × 9×10$^{-6}$. On the other hand, the reflective index difference Δn between the retarded-phase axis and advanced-phase axis of the phase retardation plate 31 shown in FIG. 6B is given by equation (11). The thickness of the phase retardation plate 31 is 10 mm. From the above, the retardation Γ of the phase retardation plate 31 is $2.85 \times 10^{-12} \sigma \times 10^{-2}$. Hence in order to obtain retardation comparable to that of phase retardation plate 15, a stress of approximately $2.6 \times 10^6$ N/m$^2$ must be applied to the phase retardation plate 31. By thus setting the stress σ to be applied to the phase retardation plate 31 to a prescribed value, the retardation of the phase retardation plate 31 can be set to be approximately the same as that of phase retardation plate 15 in the first embodiment, and moreover by adjusting the stress σ, fine adjustment of the retardation can be performed.

In the above, interferometers 1 of the first and second embodiments of the invention have been explained. These interferometers 1 can be used in a demodulator which demodulates optical signals modulated by differential phase shift keying (DPSK) or another modulation method. When using an interferometer 1 in a modulator, the following procedure may be used. The optical path length difference between the split beam L1 and split beam L2 is set such that there is a delay in the split beam L2, relative to the split beam L1, of time duration equivalent to one bit of the modulation rate of the incident optical signals. Further, a photodetector (not shown) is provided which receives the interference light beams L3 and L4 emitted from the emission ports P2 and P3 respectively and generates demodulated signals.

Third Embodiment

Figure 7:
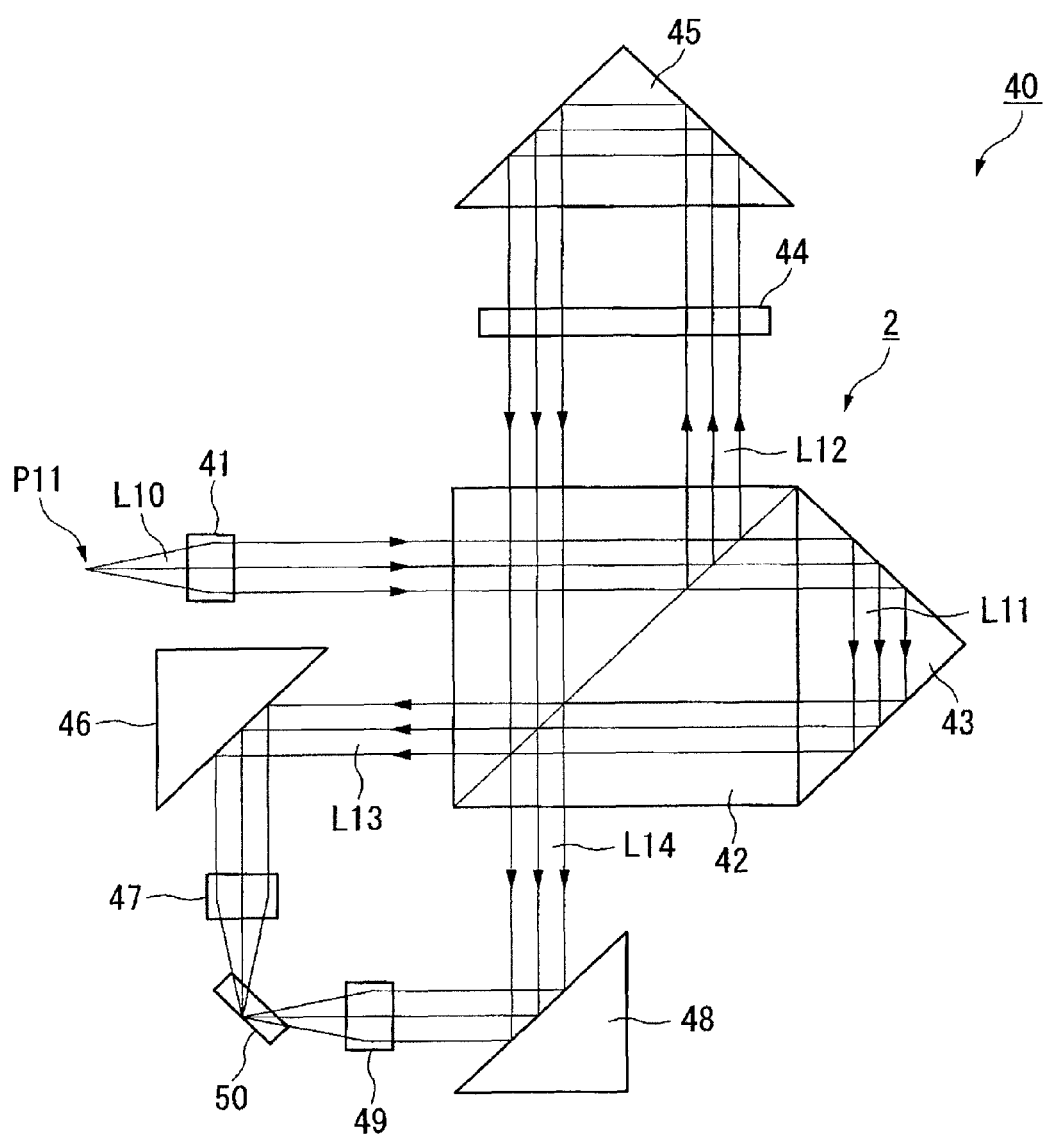
FIG. 7 shows the configuration of principal portions of a demodulator including the interferometer of a third embodiment of the invention.

FIG. 7 shows the configuration of principal portions of a demodulator including an interferometer in a third embodiment of the invention. As shown in FIG. 7, the demodulator 40 of the third embodiment includes an interferometer 2 of the third embodiment and a photodetector 50. The interferometer 2 is a Michelson-type delayed interferometer, including an incidence lens 41, half-mirror 42 (splitting element), right-angle prism 43 (reflecting member), phase retardation plate 44 (phase compensator), right-angle prism 45 (reflecting member), reflecting mirror 46, condenser lens 47, reflecting mirror 48, and condenser lens 49.

The incidence lens 41 converts WDM light L10 (optical signals) incident from the incidence port P11 into a parallel beam. The WDM light L10 is optical signals obtained by wavelength-division multiplexing (WDM) of optical signals modulated by differential phase shift keying (DPSK) or another modulation method. At the position of the input port P11, for example, the emission end of an optical fiber (not shown) is positioned. Light emitted from the emission end of this optical fiber is made incident into the interferometer 2 as the WDM light L10.

The half-mirror 42 is similar to the half-mirror 12 shown in FIG. 1. The half-mirror 42 splits the WDM light beam L10, converted into a parallel beam by the incidence lens 41, into split beams L11 and L12 having a prescribed intensity ratio (for example, 1:1). The half-mirror 42 combines the split beams L11 and L12 reflected by the right-angle prisms 43 and 45 respectively to cause interference, and splits the interference light resulting from the interference at a prescribed intensity ratio (for example, 1:1).

The right-angle prism 43 is a prism having two faces perpendicular each other and a face (hereafter called the side face) at an angle of 45° to these faces. The right-angle prism 43 reflects the split beam L11 split by the half-mirror 42 toward the half-mirror 42. The side face of this right-angle prism 43 is laminated onto one face of the half-mirror 42 (the face from which the split beam L11 is emitted). The phase retardation plate 44 is positioned in the optical path of the other split beam L12 split by the half-mirror 42, and adjusts the phase of the split beam L12. As this phase retardation plate 44, the phase retardation plates 13 or 15 shown in FIG. 1 and FIG. 2, the phase retardation plate 20 shown in FIG. 4, or the phase retardation plate 30 or 31 shown in FIG. 6 can be used.

The right-angle prism 45, similarly to the right-angle prism 43, is a prism having two faces perpendicular each other and a side face at an angle of 45° to these faces. The side face of the right-angle prism 45 is positioned toward the half-mirror 42. The right-angle prism 45 reflects the split beam L12, split by the half-mirror 42, toward the half-mirror 42. The right-angle prism 45 is positioned relative to the half-mirror 42 such that the split beam L12 is delayed, relative to the split beam L11, by a time duration equivalent to one bit of the modulation rate of the incident WDM light L10. The delay time of the split beam L12 relative to the split beam L11 can be set arbitrarily.

Similarly to the phase retardation plate 15 shown in FIG. 1, the phase retardation plate 44 is positioned in both the outbound optical path of the split beam L12, split by the half-mirror 42 and propagating toward the right-angle prism 45, and in the inbound optical path of the split beam L12 reflected by the right-angle prism 45 and propagating toward the half-mirror 42. That is, the phase retardation plate 44 is positioned in both an outbound path of the split beam L12 propagating toward the right-angle prism 45 from the half-mirror 42, and in an inbound path of the split beam L12 propagating toward the half-mirror 42 from the right-angle prism 45. By this means, changes in the optical path of the split beam L12 (that is, shifts in position of incidence of the split beam L12 relative to the half-mirror 42) if the phase retardation plate 44 is inclined with respect to the split beam L12 can be suppressed.

The reflecting mirror 46 is positioned in the optical path of one of the interference beams L13 obtained by causing interference between the split beam L11 and the split beam L12. The reflecting mirror 46 reflects the interference beam L13 toward the condenser lens 47. The condenser lens 47 condenses the interference beam L13 reflected by the reflecting mirror 46 on the light-receiving surface of the photodetector 50. The reflecting mirror 48 is positioned in the optical path of the other interference beam L14 obtained by causing interference between the split beam L11 and split beam L12. The reflecting mirror 48 reflects the interference beam L14 toward the condenser lens 49. The condenser lens 49 condenses the interference beam L14, reflected by the reflecting mirror 48, onto the light-receiving surface of the photodetector 50. The above-described reflecting mirror 46, condenser lens 47, reflecting mirror 48, and condenser lens 49 are positioned relative to the half-mirror 42 such that the optical path of the interference beam L13 and the optical path of the interference beam L14 are of the same length.

The photodetector 50 is a balanced photodetector, including a light-receiving element (not shown) which receives the interference beam L13 and a light-receiving element (not shown) which receives the interference beam L14. The photodetector 50 performs balancing processing of the electrical signals output from each of these light-receiving elements, and outputs a demodulated signal for the WDM light L10. A balanced detection system is realized by the above-described reflecting mirror 46, condenser lens 47, reflecting mirror 48, condensing mirror 49, and photodetector 50 employed by the interferometer 2.

In the demodulator 40 with the configuration described above, the WDM light L10 is input into the interferometer 2 from the incidence port P11. This WDM light L10 is converted into a parallel beam by the incidence lens 41, and is then split into split beams L11 and L12 by the half-mirror 42. One of the split beams L11 is incident on the right-angle prism 43 from the side face of the right-angle prism 43. Then, this split beam L11 is reflected in succession by the two faces of the right-angle prism 43 perpendicular each other, and is again incident on the half-mirror 42. On the other hand, the other split beam L12 passes through the phase retardation plate 44 and is then incident on the right-angle prism 45 from the side face of the right-angle prism 45. Then, this split beam L12 is reflected in succession by the two faces of the right-angle prism 45 perpendicular each other, and after again passing through the phase retardation plate 44, it is incident on the half-mirror 42.

By causing the split beam L11 and the split beam L12 to propagate in different optical paths, the split beam L12 is delayed relative to the split beam L11 by a time duration equivalent to one bit of the modulation rate of the WDM light L10. The split beams L11 and L12 incident on the half-mirror 42 are combined and caused to interfere by the half-mirror 42. By this means, interference light beams L13 and L14, in which phase comparison of the split beam L11 with the split beam L12 delayed by the above time is perfomed, are obtained. The interference beam L13 is received by one of the light-receiving elements of the photodetector 50, via the reflecting mirror 46 and condenser lens 47, in that order. The interference beam L14 is received by the other light-receiving element of the photodetector 50, via the reflecting mirror 48 and condenser lens 49, in that order. Balancing processing of the electrical signals output from these light-receiving elements is performed by the photodetector 50, and a demodulated signal for the WDM light L10 is output.

Fourth Embodiment

Figure 8:
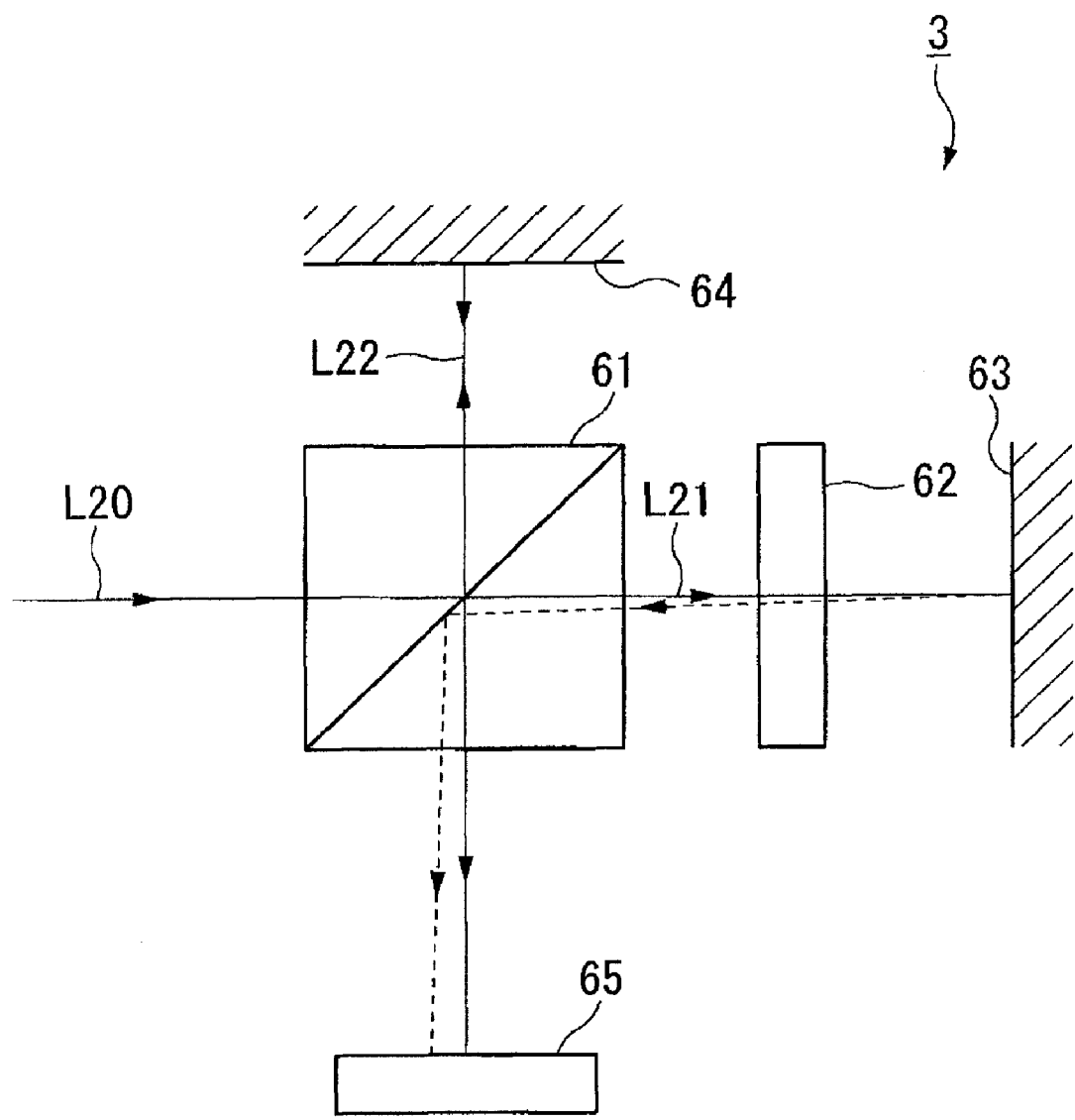
FIG. 8 shows the configuration of principal portions of the interferometer of a fourth embodiment of the invention.
Figure 9:
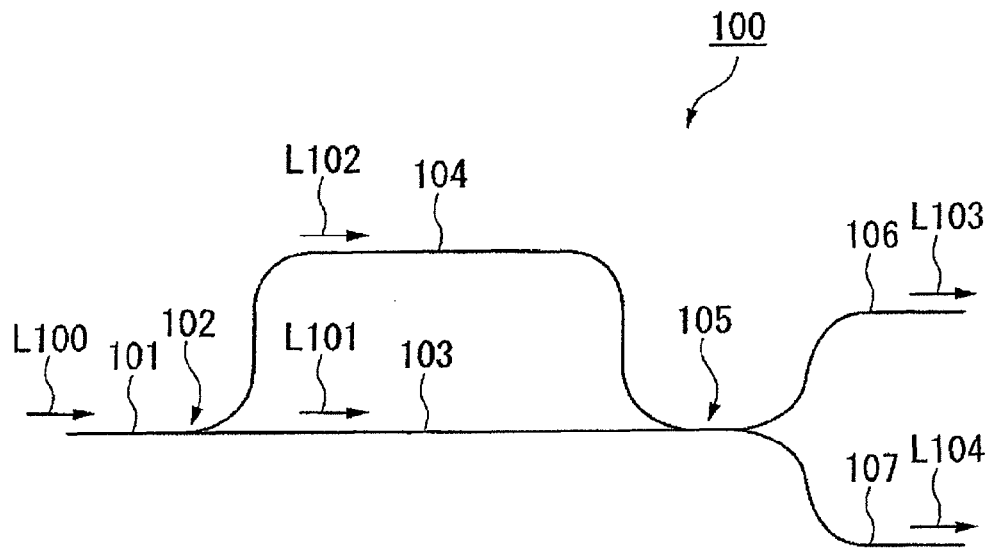
FIG. 9 shows the configuration of a delayed interferometer of the conventional art, provided in a demodulation device; and, FIG. 10 shows the configuration of a delayed interferometer of the conventional art, provided in a demodulation device.
Figure 10:
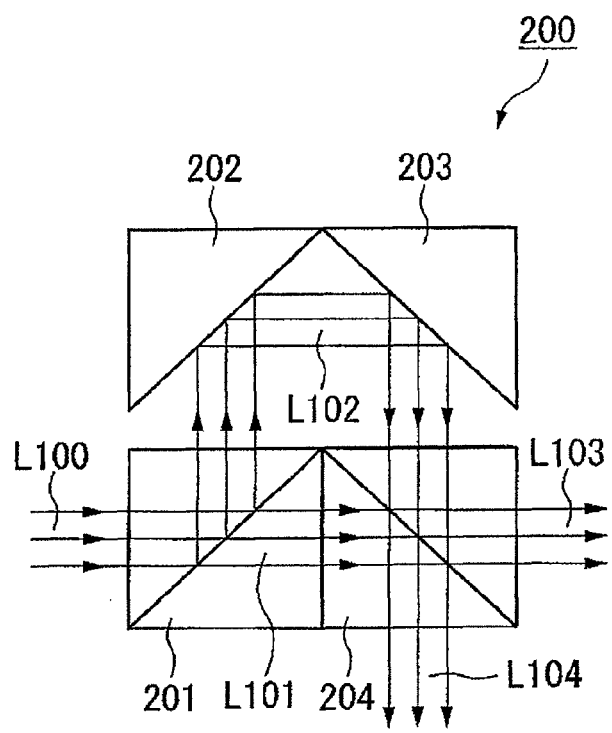

FIG. 8 shows the configuration of principal portions of the interferometer of a fourth embodiment of the invention. As shown in FIG. 4, the interferometer 3 of the fourth embodiment is a Michelson-type delayed interferometer, including a half-mirror 61, phase retardation plate 62, gradient mirror 63, reflecting mirror 64, and detector 65. The half-mirror 61 splits the incident light L20 into split beams L21 and L22 having a prescribed intensity ratio (for example, 1:1). The half-mirror 61 combines and causes interference between the split beams L21 and L22, which have been reflected by the gradient mirror 63 and the reflecting mirror 64 respectively, and splits the interference light obtained by the interference at a prescribed intensity ratio (for example, 1:1).

The phase retardation plate 62 is positioned in the optical path of one of the split beams L21 split by the half-mirror 61, and adjusts the phase of the split beam L21. As this phase retardation plate 62, the phase retardation plate 13 or 15 shown in FIGS. 1 and 2, the phase retardation plate 20 shown in FIG. 4, or the phase retardation plate 30 or 31 shown in FIG. 6 can be used. The gradient mirror 63 is positioned so as to have a prescribed gradient with respect to the split beam L21 which has passed through the phase retardation plate 62. The gradient mirror 63 reflects the split beam L21, which has passed through the phase retardation plate 62, toward the half-mirror 61.

The reflecting mirror 64 is positioned such that the reflecting face is perpendicular to the split beam L22 reflected by the half-mirror 61. The reflecting mirror 64 reflects the split beam L22 incident on the reflecting face toward the half-mirror 61. In this embodiment, the optical path lengths of the split beam L21 and of the split beam L22 may be equal, or may be different. The detector 65 includes for example a photodiode array, and detects interference fringes obtained when the split beam L21 and split beam L22 are made to interfere. The interferometer 3 with the above configuration is used to determine the wavelength or other properties of the incident light L20 from the interference fringes of the split beam L21 and split beam L22. By positioning the phase retardation plate 62 in the optical path of the split beam L21 as in the above configuration, the phase shift between the split beam L21 and split beam L22, occurring when the incident light L20 is split by the half-mirror 61, can be compensated.

As explained above, by means of the interferometers of the first through fourth embodiments of the invention, the polarization-dependent frequency shifts (PDFS) of the interferometer arising from imperfection of the half-mirror can be reduced, as follows. That is, a phase retardation plate is provided in the optical path of at least one of the split beams among the split beams split by the half-mirror, and the phase difference between the split beams occurring when the incident light is split by the half-mirror is compensated.

In the above, interferometers and demodulators of embodiments of the invention have been explained; but the invention is not limited to the above-described embodiments, and modifications can be freely made within the scope of the invention. For example, in the above-described embodiments, examples of interferometers which employ a half-mirror as the splitting element are described. This invention can also be applied to interferometers which use a beam splitter as the splitting element. In the above embodiments, an example of Michelson-type delayed interferometer was described. However, this invention is not limited to Michelson-type interferometers, and is not limited to delayed interferometers. That is, this invention can be applied to interferometers in general which include a splitting element to split incident light into a plurality of split beams, and which cause interference between the split beams split by this splitting element.

What is claimed is:

1. An interferometer, comprising:
    a splitting element which splits an incident light beam into a first split beam and a second split beam; and
    a first phase compensator which is positioned in an optical path of the first split beam, and which compensates a phase difference occurring between the first split beam and the second split beam upon splitting of the incident light beam by said splitting element,
    wherein said first phase compensator is a phase retardation plate comprising a uniaxial crystal, and a thickness of said first phase retardation plate is set according to the phase difference between the first split beam and the second split beam,
    said phase retardation plate includes a first phase retardation plate and a second phase retardation plate, said first phase retardation plate is laminated to said second phase retardation plate, said first phase retardation plate has a first thickness and is positioned such that an optical axis of said first phase retardation plate is either perpendicular to or parallel to a plane of incidence of the incident light on said splitting element, and said second phase retardation plate has a second thickness and is positioned such that an optical axis of said second phase retardation plate is perpendicular to the optical axis of said first phase retardation plate,
    the second thickness is different from the first thickness, and a difference in thickness between the first thickness and the second thickness is set according to the phase difference between the first split beam and the second split beam, and
    the difference in thickness between the first thickness and the second thickness is derived from Equation (2):

$$L=(\lambda \times \Delta f)/(\Delta n \times FSR) \qquad \text{Equation (2)}$$

wherein L is the difference in thickness between the first thickness and the second thickness, $\lambda$ is a wavelength of the incident light beam, $\Delta n$ is a difference in refractive indices of said phase retardation plate along a retarded-phase axis and an advanced-phase axis, and FSR is a frequency phase shift of an interference pattern of the interferometer.

2. The interferometer according to claim 1, wherein a laminated surface between the first phase retardation plate and the second phase retardation plate is inclined such that the first thickness and the second thickness vary within said phase retardation plate with respect to each other, and said phase retardation plate is configured to move in a direction of a change in thickness.

3. The interferometer according to claim 1, wherein the first phase retardation plate is laminated to the second phase retardation plate in a direction of the optical path of the first split beam, forming a laminated surface therebetween, and the first phase retardation plate and the second phase retardation plate are separate and distinct layers.

4. An interferometer, comprising:
    a splitting element which splits an incident light beam into a first split beam and a second split beam;
    a first phase compensator which is positioned in an optical path of the first split beam, and which compensates a phase difference occurring between the first split beam and the second split beam upon splitting of the incident light beam by said splitting element; and
    a second phase compensator which is positioned in an optical path of the second split beam, and which compensates the phase difference occurring between the first split beam and the second split beam upon splitting of the incident light beam by said splitting element,
    wherein said first phase compensator is a phase retardation plate, and
    wherein said second phase compensator is another phase retardation plate comprising a uniaxial crystal, and a difference in thickness between the thickness of said phase retardation plate and a thickness of said another phase retardation plate is set according to the phase difference between the first split beam and the second split beam.

5. The interferometer according to claim 4, wherein said phase retardation plate is formed by laminating a first phase retardation plate having a first thickness and positioned such that an optical axis of said first phase retardation plate is either perpendicular to or parallel to a plane of incidence of the incident light on said splitting element, and a second phase retardation plate having a second thickness and positioned such that an optical axis of said second phase retardation plate is perpendicular to the optical axis of said first phase retardation plate, and
    said another phase retardation plate is formed by laminating a third phase retardation plate having a third thickness and positioned such that an optical axis of said third phase retardation plate is either perpendicular to or parallel to the plane of incidence of the incident light on said splitting element, and a fourth phase retardation plate having a fourth thickness and positioned such that an optical axis of said fourth phase retardation plate is perpendicular to the optical axis of said third phase retardation plate.

6. The interferometer according to claim 5, wherein the optical axis of said first phase retardation plate is parallel to the optical axis of said third phase retardation plate.

* * * * *